(12) United States Patent
Nishihara

(10) Patent No.: US 7,403,612 B2
(45) Date of Patent: Jul. 22, 2008

(54) SLIDE MECHANISM

(75) Inventor: Taichi Nishihara, Kanagawa (JP)

(73) Assignee: Katoh Electrical Machinery Co., Ltd., Kanagawa (JP)

( * ) Notice: Subject to any disclaimer, the term of this patent is extended or adjusted under 35 U.S.C. 154(b) by 820 days.

(21) Appl. No.: 10/980,485

(22) Filed: Nov. 3, 2004

(65) Prior Publication Data
US 2005/0164751 A1 Jul. 28, 2005

(30) Foreign Application Priority Data
Jan. 26, 2004 (JP) .............................. 2004-017680

(51) Int. Cl.
*H04M 1/00* (2006.01)
*H04M 9/00* (2006.01)
(52) U.S. Cl. ................. 379/433.12; 455/575.4
(58) Field of Classification Search ............ 379/433.01, 379/433.11, 433.12; 455/573.1, 575.4, 90.3; 312/334.23, 334.27, 334.29, 334.31
See application file for complete search history.

(56) References Cited
U.S. PATENT DOCUMENTS

| | | | |
|---|---|---|---|
| 6,945,620 B2 * | 9/2005 | Lam et al. ................. | 312/334.6 |
| 7,278,184 B2 * | 10/2007 | Kuramochi ................... | 16/357 |
| 2003/0193279 A1 * | 10/2003 | Domenig ................ | 312/334.27 |
| 2004/0198477 A1 * | 10/2004 | Jung et al. ................ | 455/575.4 |
| 2005/0095995 A1 * | 5/2005 | Bae ........................... | 455/90.3 |
| 2005/0107137 A1 * | 5/2005 | Byun et al. .............. | 455/575.1 |

FOREIGN PATENT DOCUMENTS

JP 2003-125052 4/2003

* cited by examiner

*Primary Examiner*—Tuan Duc Nguyen
(74) *Attorney, Agent, or Firm*—Notaro & Michalos P.C.

(57) ABSTRACT

To attain a slide mechanism of a portable terminal device which, having a minimal number of parts and keeping the same function as that of a conventional one, enables a substantial production cost reduction, a mechanism relatively slides a first casing and a second casing in a state that the casings are laid over each other in a vertical direction, and is constituted with: a slide case mounted on either one of the first casing and the second casing; a slider slidably accommodated in the slide case and mounted on the other one of the first casing and the second casing; and a resilient means resiliently disposed between the slider and the slide case. The slide case is formed as an integral structure with a guide groove which extends to both ends in a longitudinal direction with the one end thereof being opened. Additionally the slider has a shape which enables the slider to be inserted into the guide groove in an engaged state from the open end side. Also, the slide case is further provided with a stopper portion preventing the slider from coming off after the slider is inserted into the guide groove.

9 Claims, 14 Drawing Sheets

SLIDE MECHANISM

BACKGROUND OF THE INVENTION

1. Field of the Invention

The present invention relates to a slide mechanism of a portable terminal device, and this slide mechanism is suitably used when a first casing which constitutes a transmitter section and a second casing which constitutes a receiver section of the portable terminal device such as a cellular phone in particular are slidably coupled to each other.

2. Description of the Related Art

Currently on the market is a cellular phone, as one type of a portable terminal device, which has a slide mechanism for making, in a state that a first casing being a transmitter section with a keyboard portion and a microphone portion and a second casing being a receiver section with a display portion and a speaker portion are laid over each other, a state that the first casing and the second casing are completely laid over each other with the second casing covering an upper surface of the first casing and a state that the second casing is slid in a longitudinal direction along the first casing so that the upper surface of the first casing is exposed. Such a slide mechanism is publicly known as shown in Japanese Patent Application Laid-open No. 2003-125052.

The slide mechanism described in the above document is structured of two slide modules composed of a slide case made of a slide cover and a lock plate which are laid over and fixed, a slider slidably accommodated in the slide case, and a leaf spring which is resiliently disposed between the slider and the slide case. The slide modules are parallelly provided on a lower surface of the second casing, and two mounting pins are protruded from the slider to be fixed with screws on the upper surface of the first casing.

The above-described structure requires means for engaging the slide cover and the lock plate, which constitute the slide case, to each other. Consequently, the structure of the slide case becomes complex. Additionally, it is also required to caulk and fix the slide case and the lock plate to each other or to spot-weld them for further intensity. As a result, there exists a problem that a production cost becomes high.

SUMMARY OF THE INVENTION

In view of the above, it is an object of the present invention to provide a slide mechanism of a portable terminal device which, having a minimal number of parts and keeping the same function as that of a conventional one, enables a substantial production cost reduction.

In order to achieve the object stated above, the present invention is a mechanism for relatively sliding a first casing and a second casing in a state that the casings are laid over each other in a vertical direction, and is constituted with: a slide case mounted on either one of the first casing and the second casing; a slider slidably accommodated in the slide case and mounted on the other one of the first casing and the second casing; and a resilient means resiliently disposed between the slider and the slide case. Additionally, the present invention is characterized in that the slide case is formed as an integral structure with a guide groove which extends to both ends in a longitudinal direction with the one end thereof being opened, that the slider has a shape which enables the slider to be inserted into the guide groove in an engaged state from the open end side, and that the slide case is further provided with a stopper portion preventing the slider from coming off after the slider is inserted into the guide groove.

Further, the present invention is the mechanism for relatively sliding the first casing and the second casing in the state that the casings are laid over each other in the vertical direction, and is constituted with: the slide case mounted on either one of the first casing and the second casing; the slider slidably accommodated in the slide case and mounted on the other one of the first casing and the second casing; and the resilient means resiliently disposed between the slider and the slide case. Additionally, the present invention is characterized in that the slide case is formed as the integral structure with the guide groove which extends to the both ends in the longitudinal direction with the one end thereof being opened, that the slider has a projecting shape in a cross section which enables the slider to be inserted into the guide groove in the engaged state from the open end side, and that the slide case further provided with the stopper portion preventing the slider from coming off after the slider is inserted into the guide groove.

The above-described invention can also be structured such that the slide case is integrally formed by press working and constituted with a base plate portion and the guide groove formed of side plate portions bent from both sides of the base plate portion and hooking portions bent inward from respective free ends of the side plate portions.

The above-described invention can also be structured such that the resilient means is structured of one leaf spring with an arched shape and that the slider is provided with projection portions preventing a wobble of the slider at both sides across a top portion of the leaf spring.

The above-described invention can also be structured such that the slider is provided with a female screw portion on a part exposed from the guide groove of the slide case.

The above-described invention can also be structured such that the stopper portion is formed by bending an end portion of a side plate portion or a hooking portion of the slide case.

The above-described invention can also be structured such that the stopper portion is formed of a cut-and-raised piece which is cut and raised from a base plate portion of the slide case.

Since the slide case is formed integrally and has a simple structure, a number of parts and a man-hour for assembly are reduced so that a substantial cost reduction is achievable. Additionally, by providing the sliding case with the stopper portion, the slider which is fit into the guide groove can be easily prevented from coming off. Further, by providing the slider with projection portions it becomes possible that only one leaf spring is required to be disposed between the slide case and the slider, and also in this respect, the number of parts is reduced to achieve the cost reduction.

DETAILED DESCRIPTION OF THE PREFERRED EMBODIMENTS

Hereinafter, a case that an embodiment of the present invention is applied to a cellular phone will be described, but a slide mechanism according to the present invention can also be applied to a portable information terminal such as Zaurus (trademark) for example, a calculator, a pocket computer, a hand-held gaming device, an ashtray, a cover of a case and so forth.

Figure 1:
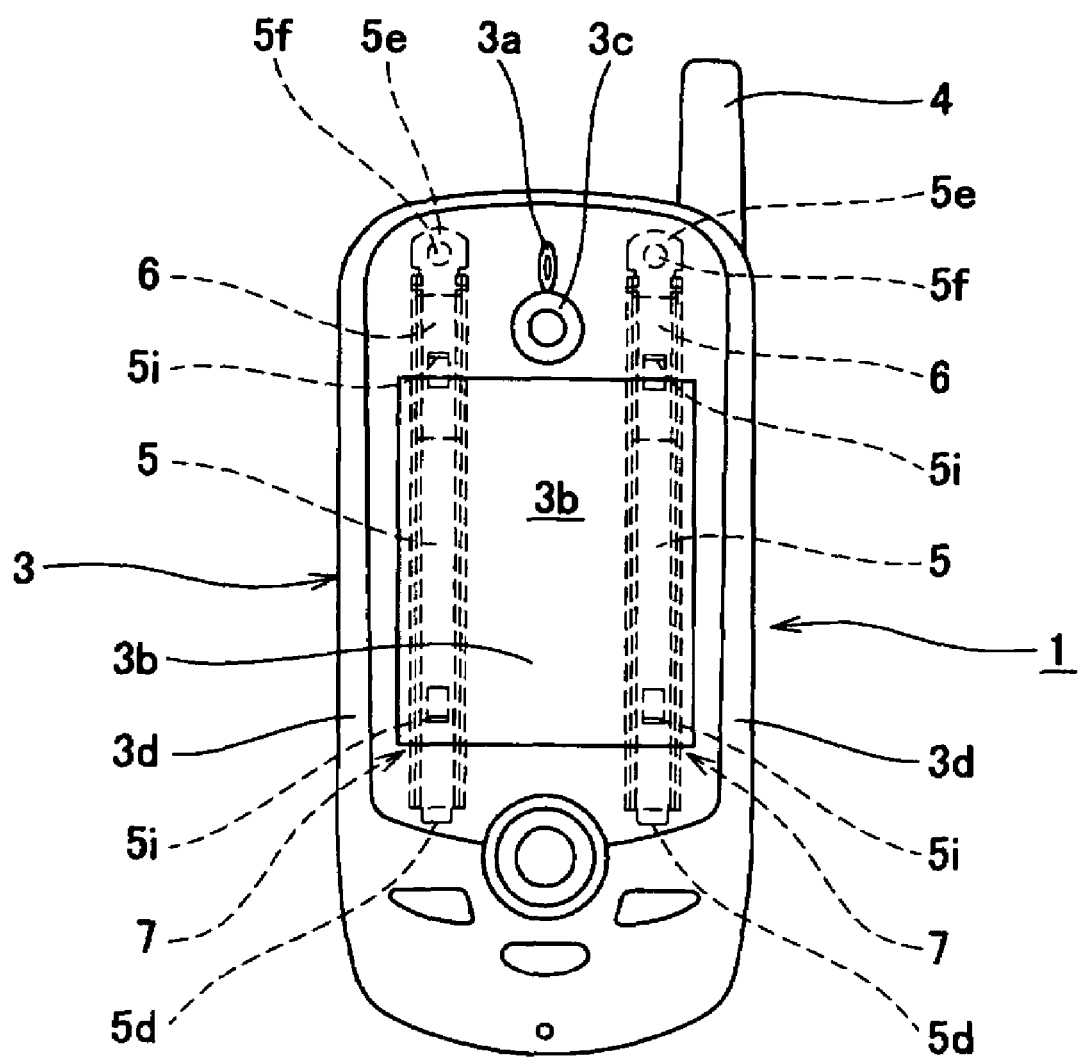
FIG. 1 is a plan view showing a state that a receiving section and a transmitter section, of a cellular phone as one type of a portable terminal device to which a slide mechanism according to the present invention is applied, are closed.
Figure 2:
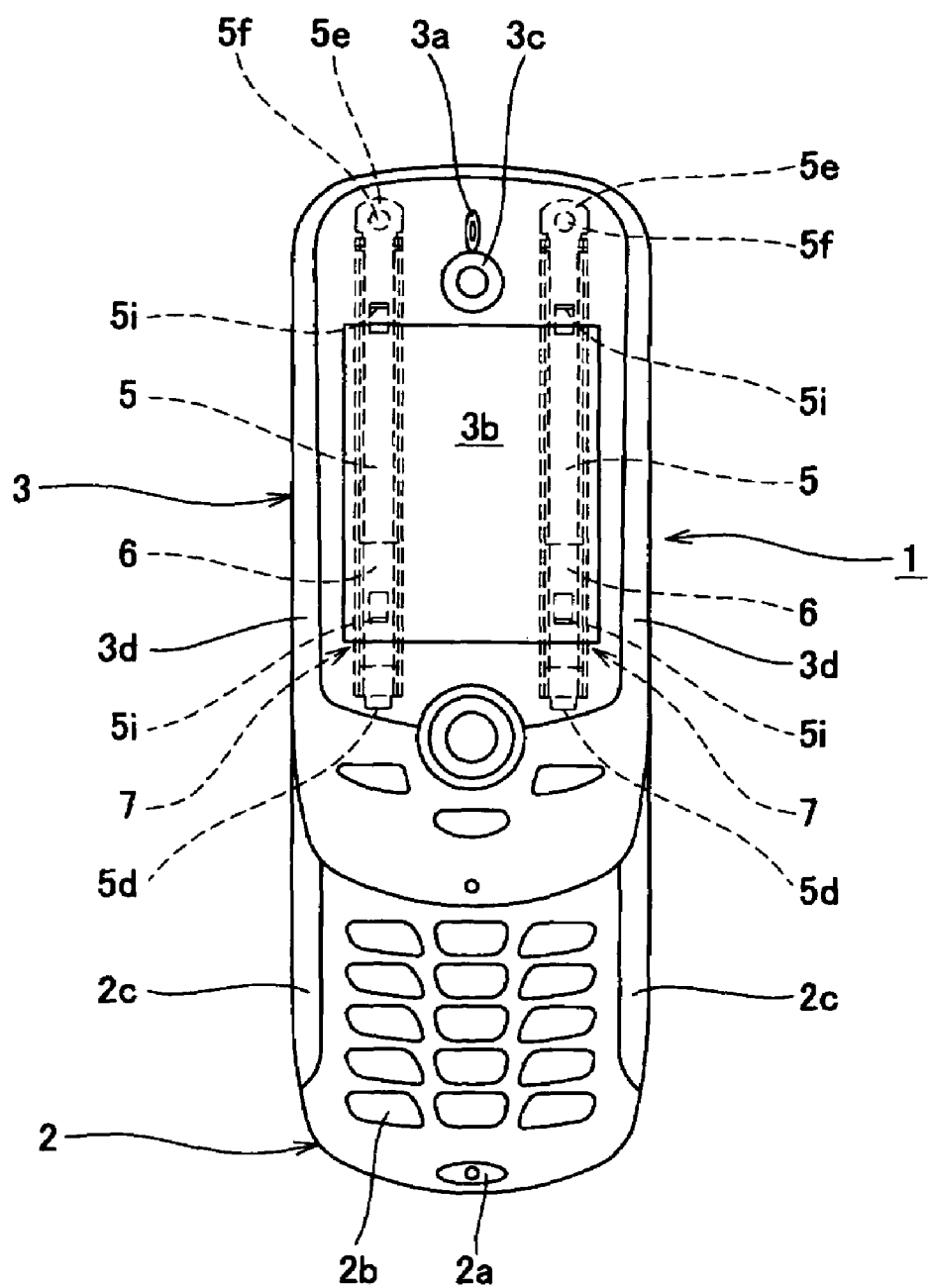
FIG. 2 is a plan view showing a state that the transmitter section and the receiving section are relatively slid, from a state shown in FIG. 1.
Figure 3:
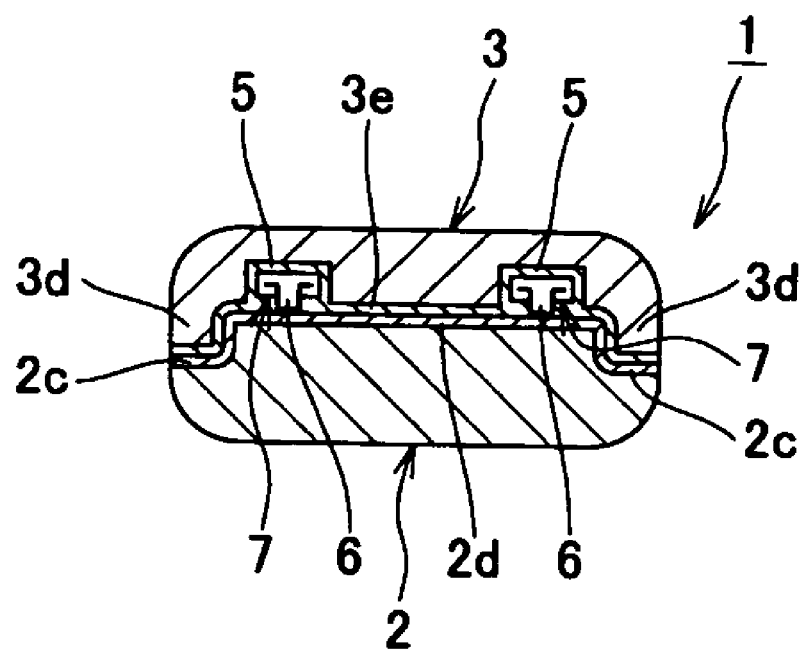
FIG. 3 is a vertical side view generally showing a state how the slide mechanism is mounted on the portable terminal device in the state shown in FIG. 1.

Hereinafter, the embodiment of the present invention will be described in detail based on FIG. 1 to FIG. 9. In FIG. 1 to FIG. 3 in particular, a reference numeral 2 denotes a transmitter section of the cellular phone 1 as one type of a portable terminal device, and this transmitter section constitutes a first casing. On a front surface of the first casing 2, a microphone portion 2a and a keyboard portion 2b are provided. Laid over an upper part of the first casing 2 and mounted slidably in a longitudinal direction by the slide mechanism according to the present invention is a receiver section of the cellular phone 1. This receiver section constitutes a second casing 3. On a front surface of the second casing 3, a speaker portion 3a, a display device 3b, and a camera portion 3c are provided. Incidentally, a reference numeral 4 denotes an antenna. The antenna 4, being mounted on the first casing 2 side, can be mounted on the second casing 3 side.

Next, a structure of the slide mechanism according to the present invention will be described. On both sides of the upper part of the first casing 2, as shown in FIG. 3 in particular, platform portions 2c, 2c are provided. On both sides of a lower part of the second casing 3, slide portions 3d, 3d which are slidably engaged with the platform portions 2c, 2c are provided. Incidentally, the platform portions 2c, 2c and the slide portions 3d, 3d can be omitted, since the slide mechanism according to the present invention has two slide modules as described later.

Next, a reference numeral 7 denotes a slide module which constitutes the slide mechanism according to the present invention. The slide module 7 is, as shown in FIG. 1 to FIG. 3, mounted in pairs at an appropriate interval on a lower cover 3e of the second casing 3. The slide module 7 is constituted, as only one of the pairs being shown in FIG. 4 to FIG. 9 in particular, with a slide case 5 which is mounted on the lower cover 3e of the second casing 3, a slider 6 which is slidably accommodated in the slide case 5, and a leaf spring 8 which is resiliently mounted between the slider 6 and the slide case 5. The slider 6 is mounted via mounting screws 9, 9 on an upper cover 2d of the first casing 2. In this way, the slide mechanism according to the present invention is disposed between the first casing 2 and the second casing 3.

Next, the slide case 5 of the embodiment is, as shown in FIG. 5 to FIG. 9, integrally formed by press working a metal plate of stainless steel for example, and given a spring characteristic by quench hardening after press working. The slide case 5 is constituted with a base plate portion 5a, side plate portions 5b, 5b which are bent and drooped from both sides of the base plate portion 5a, hooking portions 5c, 5c which are formed by bending inward free ends of the side plate portions 5b, 5b, and a locking piece 5d and a mounting piece 5e which are formed at both ends in a longitudinal direction of the base plate portion 5a. On the mounting piece 5e, a mounting hole 5f is provided.

In this way, in the slide case 5, a guide groove 10 is formed of the base plate portion 5a, the respective side plate portions 5b, 5b, and the hooking portions 5c, 5c. At a locking piece 5d side of the slide case 5 a catching portion 5g which is bent from the base plate portion 5a is provided, and on a mounting piece 5e side stopper portions 5h, 5h are formed by bending parts of the hooking portions 5c, 5c to a base plate portion 5a side. Additionally, on both sides in the longitudinal direction of the base plate portion 5a of the slide case 5, locking projection portions 5i, 5i which are raised by press working are provided.

Figure 9:
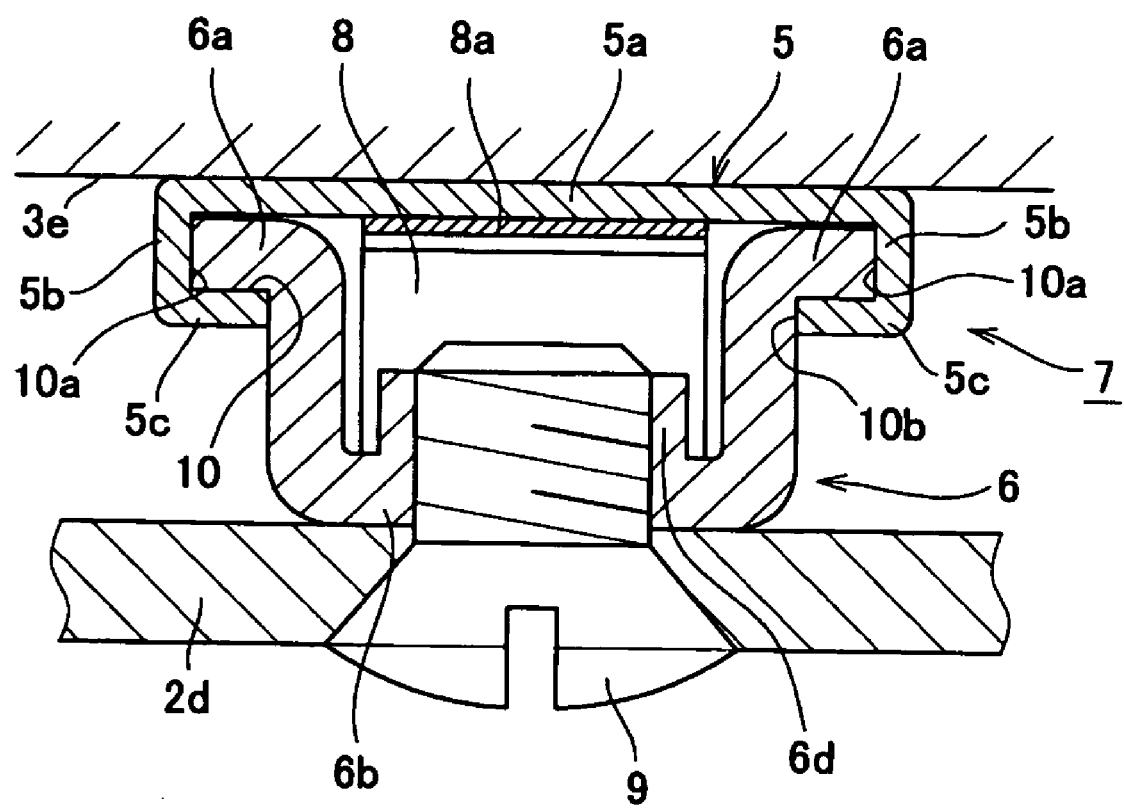
FIG. 9 is an enlarged vertical sectional view showing an inner structure of a slide module part of the slide mechanism according to the present invention.

The slider 6 is constituted with a pair of guide pieces 6a, 6a and a guiding projection portion 6b and has a projecting shape in a cross section. As shown in FIG. 9 in particular, the slider 6 is slidably accommodated by fitting the guide pieces 6a, 6a in engaging portions 10a, 10a of the guide groove 10 and fitting the guiding projection portion 6b into a groove portion 10b of the guide groove 10. The slider 6 is also formed by press working a metal plate such as stainless steel, and given a spring characteristic by quench hardening after press working. On the respective guide pieces 6a, 6a of the slider 6, pairs of projection portions 6c, 6c-6c, 6c are provided at appropriate intervals. On the guiding projection portion 6b female screw portions 6d, 6d are formed at an appropriate interval by burring, for example.

Between the base plate portion 5a of the slide case 5 and an inside top portion of the guiding projection portion 6b of the slider 6, the leaf spring 8 with an arc-shaped cross section is resiliently disposed. In a center of the leaf spring 8 a locking portion 8a is provided and both ends of the leaf spring 8 are caught by the female screw portions 6d, 6d.

Figure 10:
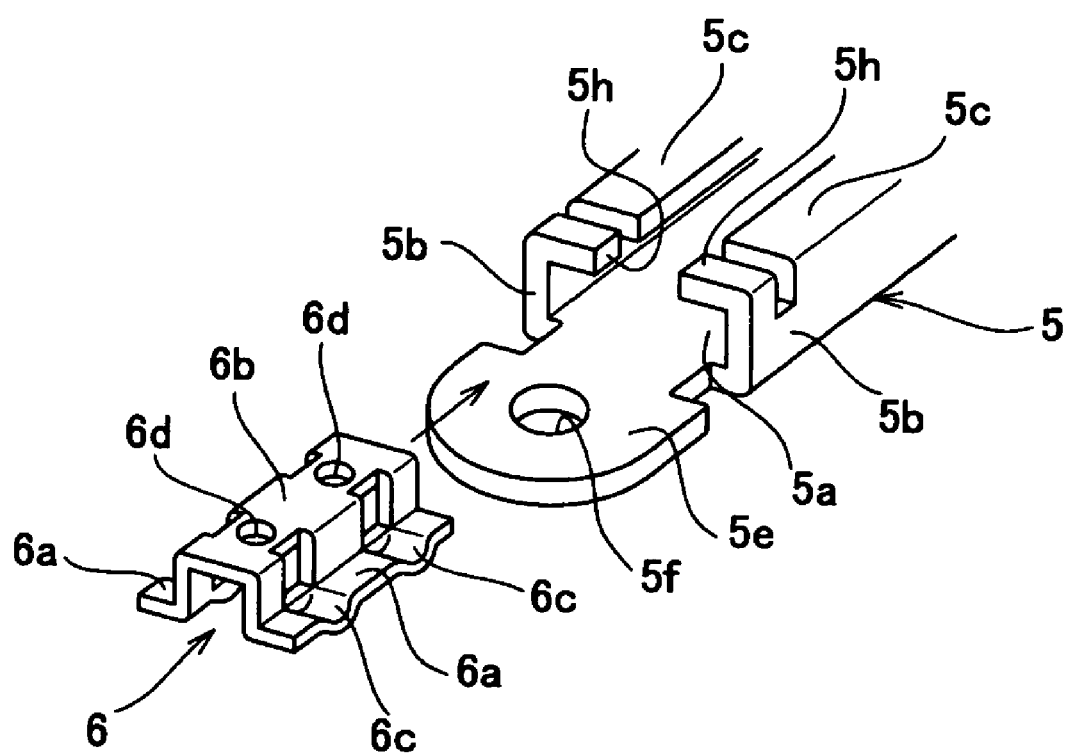
FIG. 10 is an explanatory view showing a state before a slider is set in the slide case.
Figure 11:
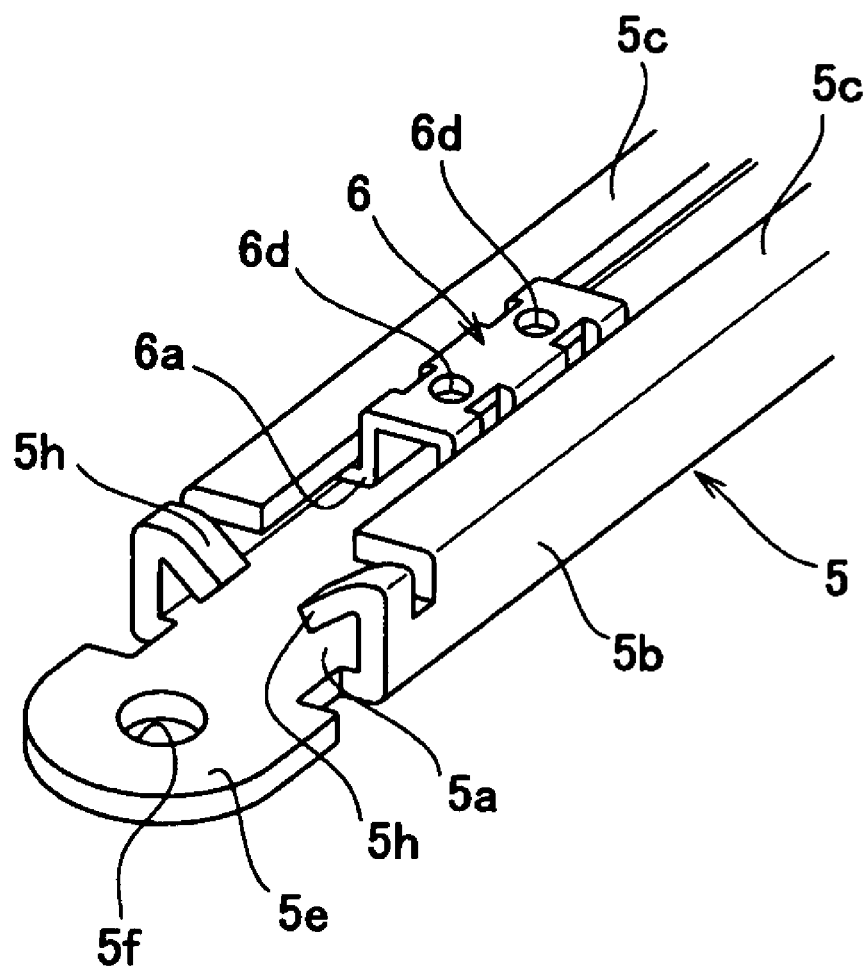
FIG. 11 is an explanatory view showing a state after the slider is set in the slide case.

When the above-described slide module 7 is assembled, as shown in FIG. 10, before the stopper portions 5h, 5h of the slide case 5 are bent, the slider 6 and the leaf spring 8 together are fit into the guide groove 10 of the slide case 5 from a direction of an arrow, with the both ends of the leaf spring 8 being caught by the female screw portions 6d, 6d of the slider 6. After that, by bending the stopper portions 5h, 5h to the base plate portion 5a side with a jig (not shown), assembly is completed and at the same time the slider 6 is prevented from coming off the slide case 5. Incidentally, only a single stopper portion 5h can be provided instead of the plural stopper portions 5h, 5h.

The slide case 5 is mounted on the receiver section 3 side, while the female screw portions 6d, 6d provided on the guiding projection portion 6b of the slider 6 are fixed with mounting screws 9, 9 on the first casing 2. In the embodiment, as shown in FIG. 1 to FIG. 3, the slide mechanism with the pair of slide modules 7 is exemplified, but the present invention is not limited thereto. A single slide module 7 can be used instead of the pair of the slide modules 7.

Figure 4:
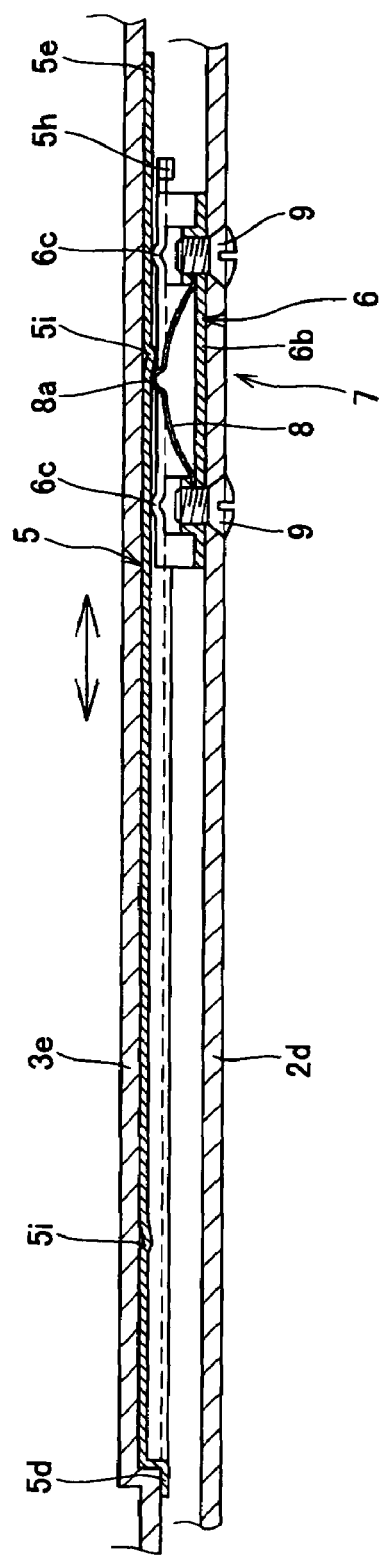
FIG. 4 is a sectional view explaining an inner structure of the slide mechanism according to the present invention and a state how the slide mechanism is mounted on the portable terminal device.
Figure 5:
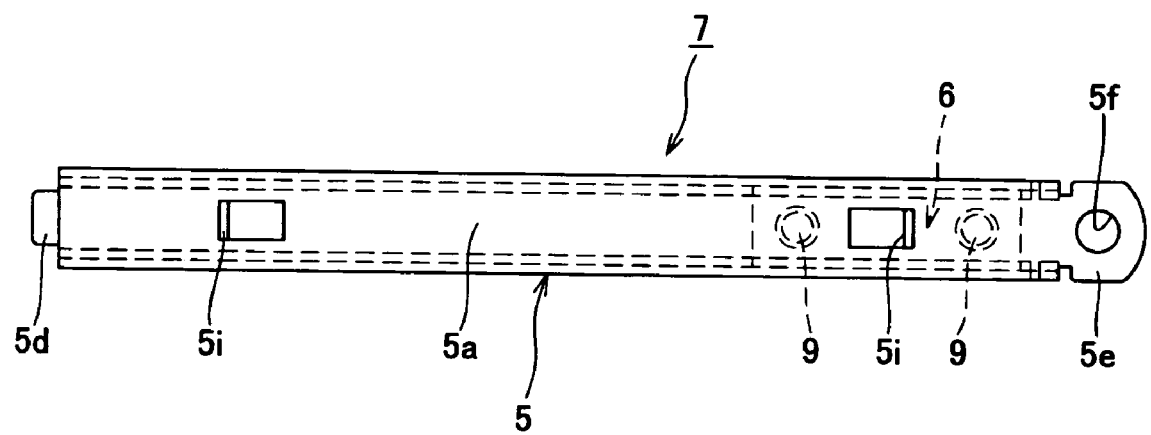
FIG. 5 is a plan view of a slide module of the slide mechanism according to the present invention.
Figure 6:
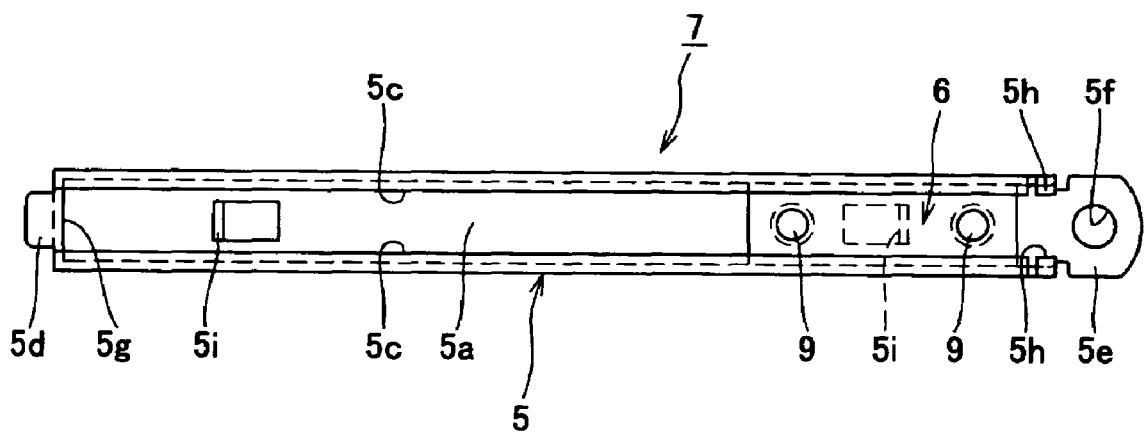
FIG. 6 is a bottom view of the slide module of the slide mechanism according to the present invention.
Figure 7:
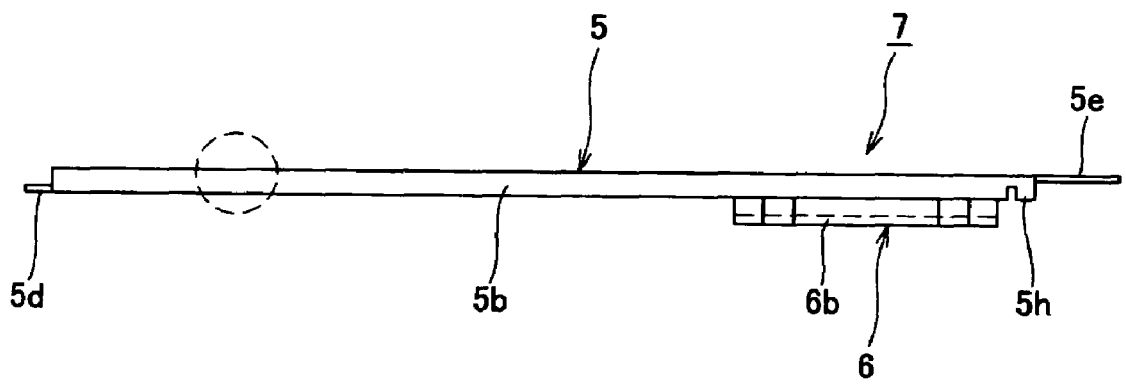
FIG. 7 is a side view of the slide module of the slide mechanism according to the present invention.
Figure 8:
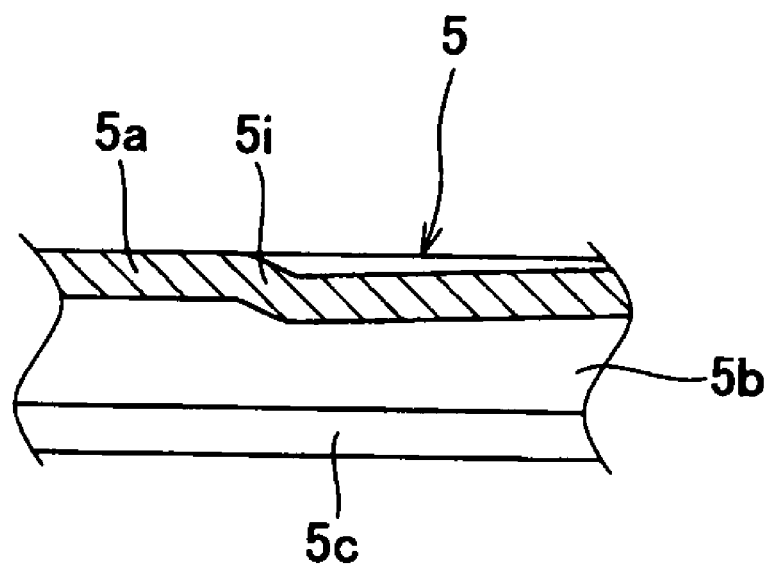
FIG. 8 is an enlarged sectional view of a locking projection portion provided on a slide case of the slide module of the slide mechanism according to the present invention.

In a state that the transmitter section 2 which constitutes the first casing and the receiver section 3 which constitutes the second casing are laid over each other as shown in FIG. 1, the slider 6 is at a starting position of the slide case 5 as indicated with solid lines in FIG. 4. At this time the locking portion 8a of the leaf spring 8 is engaged with the locking projection portion 5i and an end of the slider 6 abuts the stopper portions 5h, 5h, so that the slider 6 is locked in a closed state shown in FIG. 1.

Next, when the receiver section 3 is pushed in a direction of the antenna 4 in order for operating the keyboard portion 2b of the receiver section 2, the locking portion 8a of the leaf spring 8 is disengaged from the locking projection portion 5i. Then the slider 6 is guided along the guide groove 10 of the slide case 5, so that the receiver section 3 can slide in the direction of the antenna 4. Consequently, as shown in FIG. 2, the keyboard portion 2b on the transmitter section 2 is exposed so as to be able to be operated.

When the slider 6 slides in the slide case 5, the locking portion 8a of the leaf spring 8 pressure-contacts on the base plate portion 5a, so that sliding is conducted in a free stop way. At the same time, the projection portions 6c, 6c-6c, 6c of the guide pieces 6a, 6a of the slider 6 contact on the base plate portion 5a. Therefore, a vertical swing of the slider 6 by the leaf spring 8 pressure-contacting on the base plate portion 5a at a time of sliding of the slider 6 is prevented.

The receiver section 3, sliding on an upper surface of the transmitter section 2, completely exposes the keyboard portion 2b of the transmitter section 2. Then an end of the slider 6 abuts the catching portion 5g of the slide case 5 to stop the receiver section 3. At this time the locking portion 8a of the leaf spring 8 climbs over the locking projection portion 5i provided on the base plate portion 5a and is engaged therewith, so that the slider 6 is locked at this position.

When the receiver section 3 is to return to an original position, the receiver section 3 is pushed in an opposite direction from the direction described above. Then the locking portion 8a of the leaf spring 8 is disengaged from the locking projection portion 5i, allowing the slider 6 to slide. When the end of the slider 6 abuts the stopper portions 5h, 5h, the slider 6 stops. At this time, the locking portion 8a of the leaf spring 8 is engaged with the locking projection portion 5i of the base plate portion 5a, so that the slider 6 is locked. In this way, the receiver section 3 returns to the original position as shown in FIG. 1. Incidentally, though an example of a single leaf spring 8 is described above, it is also possible that two leaf springs are used and the projection portions 6c of the slider 6 are omitted.

Figure 12:
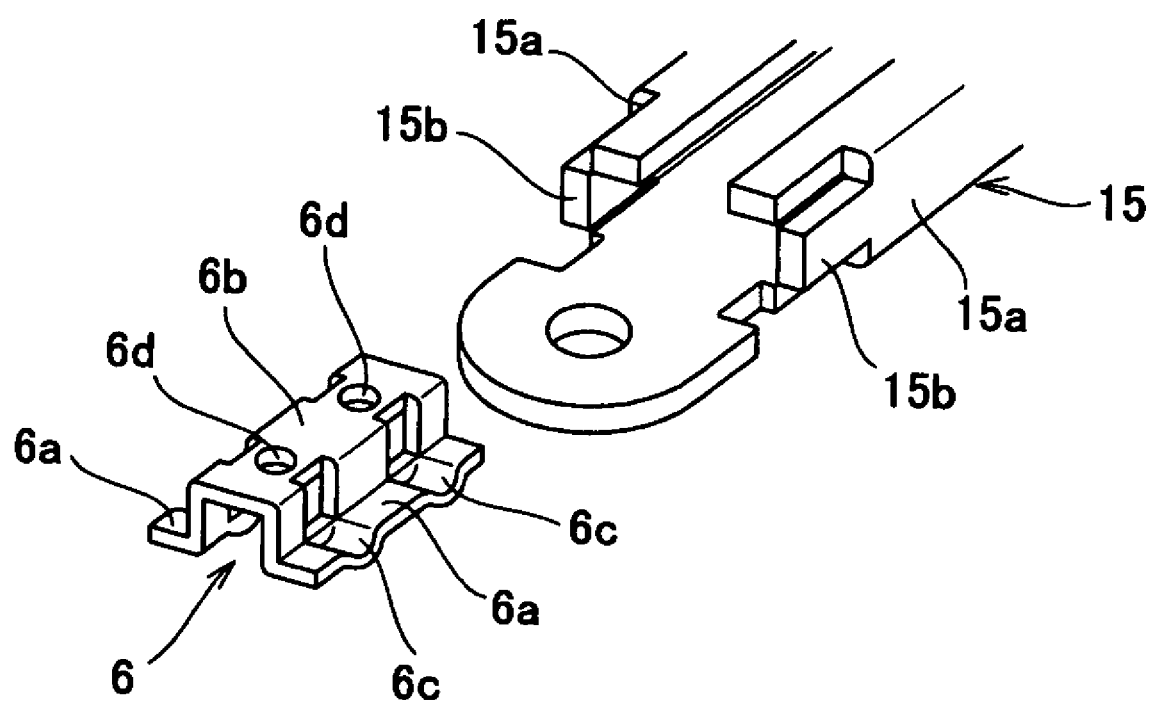
FIG. 12 is an explanatory view of another embodiment, which shows a state before a slider is set in a slide case.
Figure 13:
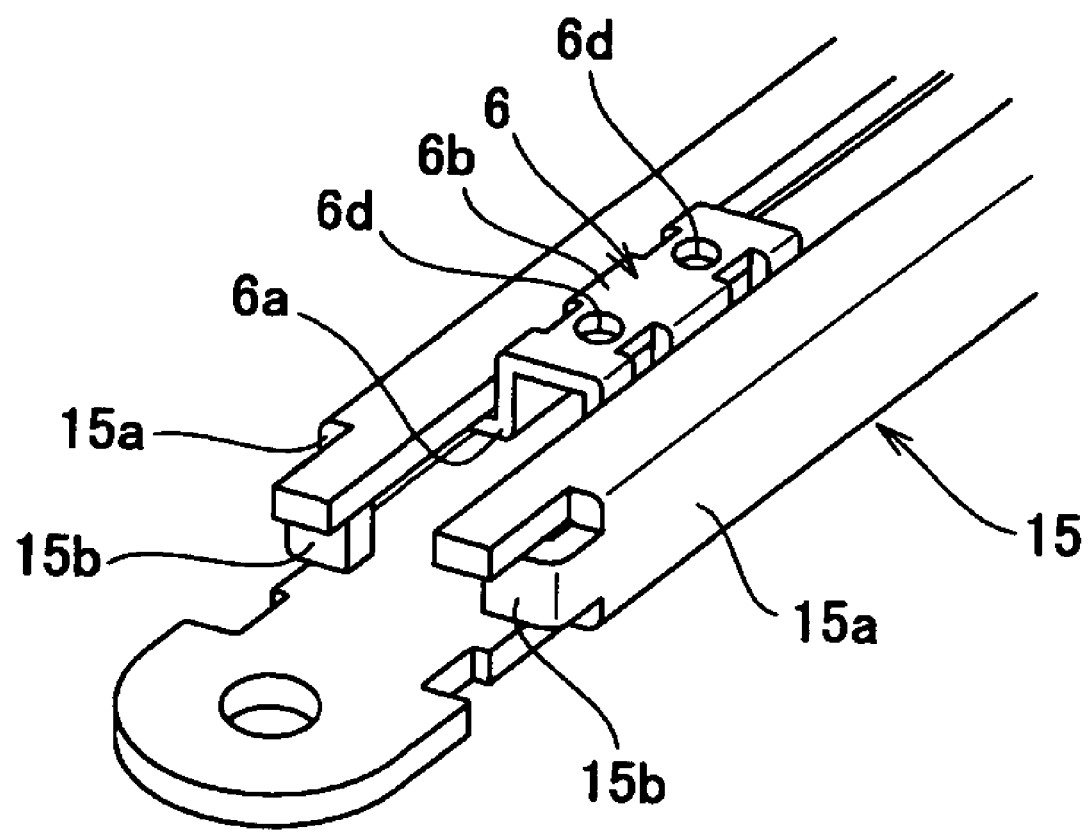
FIG. 13 is an explanatory view of the embodiment of FIG. 12, which shows a state after the slider is set in the slide case.

FIG. 12 and FIG. 13 show another embodiment of stopper portions of a slider, which are provided on a slide case. According to the drawings, as shown in FIG. 12, on a free end side of the slide case 15 stopper portions 15b, 15b are formed at tips of side plate portions 15a, 15a, and as shown in FIG. 13 after a slider 6 is fit into a slide case 15 the stopper portions 15b, 15b are bent inward with a jig (not shown) to prevent the slider 6 from coming off the slide case 15. Incidentally, the stopper portion 15b can be provided on only one of the side plate portions 15a.

Figure 14:
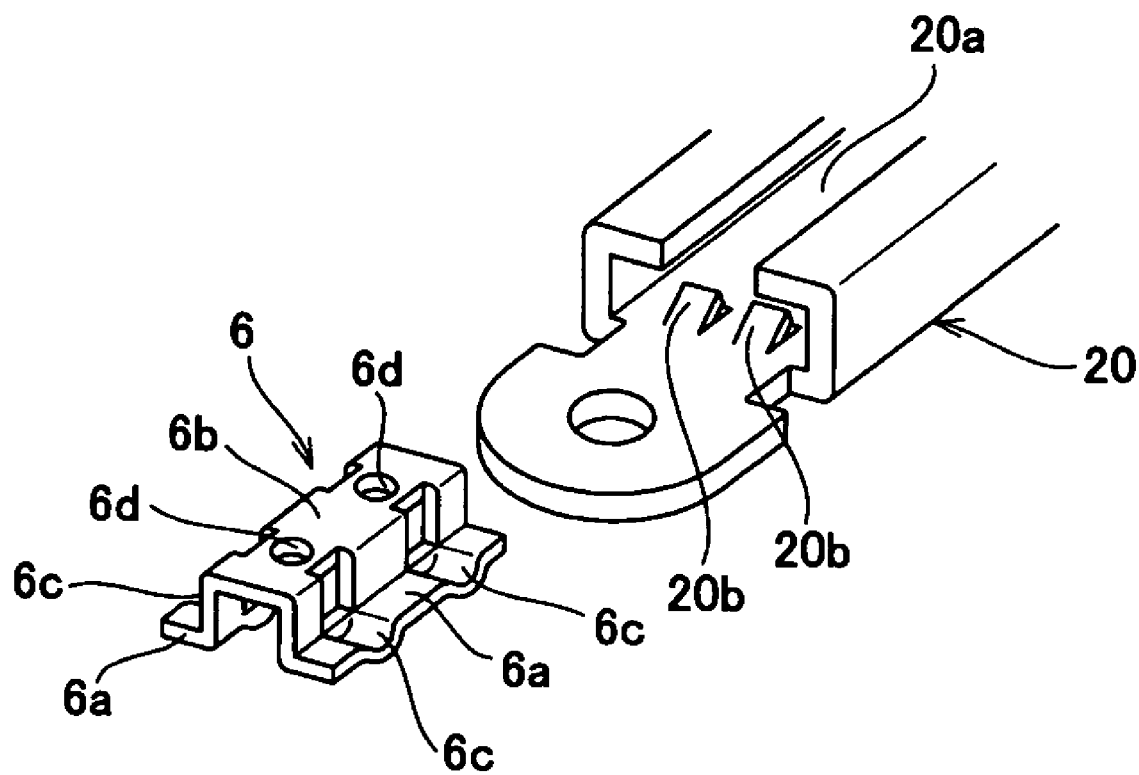
FIG. 14 is an explanatory view of still another embodiment of a case that a slider is set in a slide case.

FIG. 14 shows still another embodiment of stopper portions of a slider, which are provided on a slide case. According to the drawing, on a base plate portion 20a of a slide case 20, stopper portions 20b, 20b which are formed of cut-and-raised pieces with resilience are provided. When a slider 6 is fit into the slide case 20, the stopper portions 20b, 20b are bent and allow the slider 6 to be fit into the slide case 20 and subsequently returns to an original position to be the stopper portions. In this way, the stopper portions 20b, 20b prevents the slider 6 from coming off the slide case 20. Incidentally, a single stopper portion 20b can be formed instead of two. Also, it is possible that the piece is raised with a jig and made into a stopper portion after the slider 6 is fit into.

In the above embodiments, the slide case S is mounted on the second casing 3 and the slider 6 is mounted on the first casing 2. However, the slide case 5 can be mounted on the first casing 2 and the slider 6 can be mounted on the second casing 3.

As described in detail above, the slide mechanism according to the present invention has a small number of parts and can be produced at low cost, and therefore is suitably used for a cellular phone in particular among slide-type portable terminal devices.

What is claimed is:

1. A slide mechanism which is a mechanism for relatively sliding a first casing and a second casing of a portable terminal device in a state that the casings are laid over each other in a vertical direction, said slide mechanism comprising:
   a slide case mounted on either one of the first casing and the second casing;
   a slider slidably accommodated in said slide case and mounted on the other one of the first casing and the second casing; and
   a resilient means resiliently disposed between said slider and said slide case,
   wherein said slide case is formed as an integral structure with a guide groove which extends to both ends in a longitudinal direction with the one end thereof being opened,
   wherein said slider has a shape which enables said slider to be inserted into the guide groove in an engaged state from the open end side, and
   wherein said slide case is further provided with a stopper portion preventing said slider from coming off after said slider is inserted into the guide.

2. The slide mechanism according to claim 1 which is the mechanism for relatively sliding the first casing and the second casing in the state that the casings are laid over each other in the vertical direction, said slide mechanism comprising:
   said slide case mounted on either one of the first casing and the second casing;
   said slider slidably accommodated in said slide case and mounted on the other one of the first casing and the second casing; and
   said resilient means resiliently disposed between said slider and said slide case,
   wherein said slide case is formed as the integral structure with the guide groove which extends to the both ends in the longitudinal direction with the one end thereof being opened,
   wherein said slider has a projecting shape in a cross section which enables said slider to be inserted into the guide groove in the engaged state from the open end side, and
   wherein said slide case is further provided with the stopper portion preventing said slider from coming off after said slider is inserted into the guide groove.

3. The slide mechanism according to claim 1, wherein said slide case is integrally formed by press working and constituted with a base plate portion and the guide groove formed of side plate portions bent from both sides of the base plate portion and hooking portions bent inward from respective free ends of the side plate portions.

4. The slide mechanism according to claim 1, wherein said resilient means is structured of one leaf spring with an arched shape, and wherein said slider is provided with projection portions preventing a wobble of said slider at both sides across a top portion of the leaf spring.

5. The slide mechanism according to claim 2, wherein said slider is provided with a female screw portion on a part exposed from the guide groove of said slide case.

6. The slide mechanism according to claim 1, wherein the stopper portion is formed by bending an end portion of a side plate portion or a hooking portion of said slide case.

7. The slide mechanism according to claim 1, wherein the stopper portion is formed of a cut-and-raised piece which is cut and raised from a base plate portion of said slide case.

8. The slide mechanism according to claim 2, wherein said slide case is integrally formed by press working and constituted with a base plate portion and the guide groove formed of side plate portions bent from both sides of the base plate portion and hooking portions bent inward from respective free ends of the side plate portions.

9. The slide mechanism according to claim 2, wherein said resilient means is structured of one leaf spring with an arched shape, and wherein said slider is provided with projection portions preventing a wobble of said slider at both sides across a top portion of the leaf spring.

* * * * *